O. W. DONNER.
Apparatus for Washing Filter-Bags.
No. 203,714. Patented May 14, 1878.
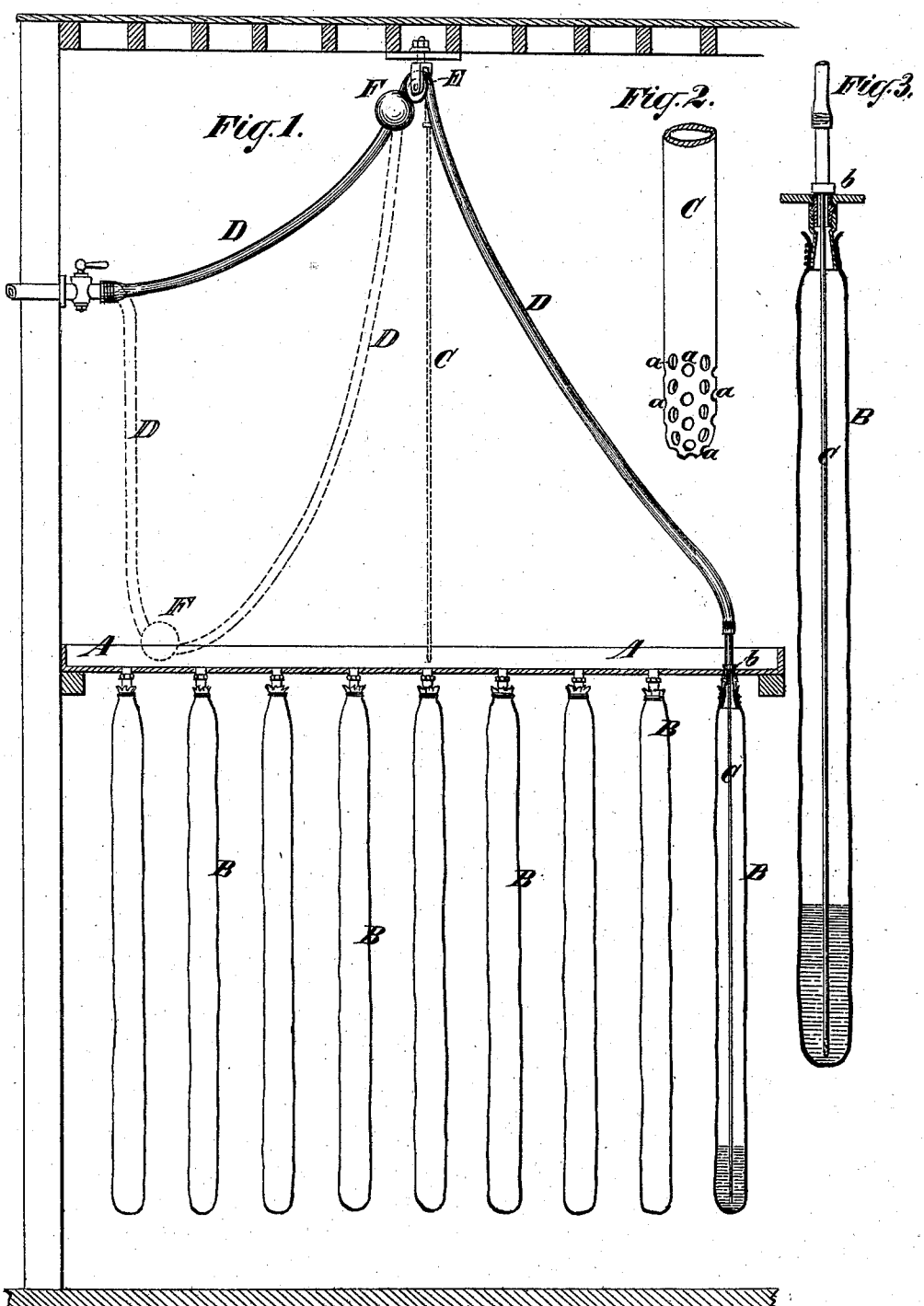

UNITED STATES PATENT OFFICE.

OSCAR W. DONNER, OF BROOKLYN, NEW YORK.

IMPROVEMENT IN APPARATUS FOR WASHING FILTER-BAGS.

Specification forming part of Letters Patent No. 203,714, dated May 14, 1878; application filed February 20, 1878.

*To all whom it may concern:*

Be it known that I, OSCAR W. DONNER, of Brooklyn, in the county of Kings and State of New York, have invented a new and useful Improvement in Apparatus for Washing Filter-Bags for filtering sugar and other solutions; and I do hereby declare that the following is a full, clear, and exact description of the same, reference being had to the accompanying drawing, forming part of this specification.

This invention relates to apparatus known as "bag-filters," extensively used in sugar-refineries, and applicable to other purposes, the same consisting of a number of pendent filtering-bags arranged within a receiver, and with their mouths in open communication with a basin or trough above.

The invention is shown in the drawing as applied to refining sugar, for which purpose the invention is more particularly designed, and in which application it will here be described by way of illustration, although it is adapted to refining various fluid substances.

It may be here observed that the saccharine solution to be filtered is first run into the basin hereinafter described, and from thence into the filtering-bags, after which water is introduced into the basin to wash out saccharine solution remaining in the bags.

There has hitherto been a defect in such operation as the apparatus has been ordinarily constructed, which it is the object of my invention to avoid. In the ordinary way saccharine solution to be filtered is conveyed into the basin by means of a pipe, and the liquid or solution naturally enters those bags first which are nearest to such supply. The same effect takes place when water is introduced into the basin to wash out the remaining solution in the bags, which causes great waste of the cleansing-water, inasmuch as the bags which are first or most perfectly cleansed allow the water to run much more freely through them than do the other bags, besides adding more water than is desirable to the filtering solution.

I remedy this defect in my invention, by which I regulate and control the amount of cleansing-water applied, reducing it to a minimum, and yet attaining the best possible result as to the successful removal of all saccharine matter contained in the bags; and, further, I accelerate this cleansing operation as compared with all other methods now practiced wherever filter-bags are in use, and thereby secure a great saving in time, labor, and material.

The following is a description of the apparatus and its use, referring to the accompanying drawing, in which—

Figure 1 is a vertical section, and Figs. 2 and 3 are enlarged details, of an apparatus constructed in accordance with my invention.

In the drawing, the basin which ordinarily receives and distributes the water to the filter-bags is represented at A. B represents the filter-bags, attached to the bottom of said basin or trough A, in the usual manner, above a receiver, which receives and holds the sweet water. One of the filtering-bags is shown in vertical section in Fig. 1, and another in Fig. 3. C is a hollow iron or copper tube, open at one end, and pierced laterally in various directions, with a number of small openings, $a$, at the lower end, where the tube itself is closed and smoothly rounded off, so as not to catch in or tear the bags when in use. This tube is of sufficient length to wash the bottom end of the bag while hanging suspended from a nozzle in an ordinary so-called "Taylor filter," and still to project about one foot outside of and above the bag, sticking out of the nozzle. The size of the tube depends on the size of the nozzle in use, and is always chosen small enough to be easily introduced and withdrawn through said nozzle.

To the open end of this tube a flexible hose, D, of rubber or leather, is securely fastened, which leads to a pipe or tank containing the hot water, the flow of which is regulated by a stop-cock.

As a general rule, there are two distinct methods practiced in the work upon the material operated upon, be it a sugar or other solution, at the time the bags are filled with a mixture of the filtering-fluid, and all the fiber, sand, and impurities of various descriptions are retained, choking the meshes of their texture.

One method of operation in use is to remove the entire bag with its contents from the bag-filter by unscrewing the nozzle and taking the bags to separate tanks for washing, &c. Of course, this method has great disadvantages compared to the second method in general practice, which is intended to remove such remnants of the filtering-fluid from the bags while yet suspended in the bag-filter.

It is a general practice to follow the filtering-fluid at certain intervals of time with measured or unmeasured quantities of hot water introduced from the top, and to continue this until the filtering-fluid is removed as far as possible, leaving the impurities remaining in the bag.

The disadvantage of this method is the large quantity of water necessary and the length of time occupied in the operation in order to reach a perfect cleansing, and, as a consequence, this scarcely ever is obtained. The cause of this is to be found in the method of applying the cleansing-water from the top by pouring it into the basin A and allowing it to enter the bag through the nozzle. As a consequence, the water washes the upper, and, in reality, cleanest, part of the bag first, passes through its meshes, and runs down on its outside, without mixing with or acting upon the heavier liquid and the greatest part of the mud always contained in the lower part of the bag.

To obviate this difficulty I introduce the cleansing-water by means of the perforated tube C and hose, as described, delivering it upon all parts of the inner surface of the bag in any desired quantities, and, at will, either more or less upon lower and dirtier or upper and cleaner parts. At the same time the lateral squirting of the water, introduced under considerable pressure, against the interior of the bag loosens, disintegrates, and permeates the accumulated mud, and also dilutes the heavy filtering-liquid uniformly, and thus causes the same to readily pass through the meshes of the bag to its outside and throughout its entire length.

I perform this operation by introducing the perforated end of the tube, after the water is turned on from above and through the opening of the nozzle, into the interior of the bag, sinking it lower and lower until the bottom of the bag is reached, at any desired speed, and withdrawing it again in the same manner. This operation is repeated, at intervals, as often as desired, giving time between each application for the resulting mixture or solution to pass through the meshes of the bag to its outside.

This method greatly accelerates the cleansing operation, and especially when aided by an application of steam to the outside of the bags. From three to four waters will be found sufficient to remove all traces of the filtering-fluid or sweet water, leaving a worthless and perfectly-washed scum in the bag, which can be thrown away without any loss or further treatment.

I may here add that the use of the tube is facilitated by passing the flexible hose connected therewith over a sheave or grooved wheel, E, suspended at a convenient height over the bag-filter, as this will relieve the operator greatly of the weight of the hose. A counterpoise, F, may also be attached to the hose on the side of the sheave opposite to that of the pipe C, to counterbalance the weight of said pipe.

Besides a saving in time and labor, I also secure by my invention an increase in the product of crystallized sugar, as it is well known that the longer uncrystallizable substances remain in a sugar solution the greater will be the inversion, and that also the longer a sugar solution remains exposed to the atmosphere before concentration the more of the crystallizable sugar is converted into uncrystallizable sugar or molasses.

At the upper part of the pipe C, I preferably place a collar, $b$, or other suitable stop, for preventing the insertion of the said pipe so far as to injure the bottom of the filter-bag, which might result in perforating the bag, and thus permitting a portion or the whole of the mud to escape.

I claim—

1. The combination, with a filter-bag for filtering sugar and other solutions, of a pipe, C, for insertion into the interior of such filter-bag through the nozzle which supports said bag, said pipe having lateral perforations at or near its lower end, substantially as and for the purpose specified.

2. The combination, with the pipe C for washing filter-bags, of a stop, $b$, for preventing said pipe from entering the bag so far as to injure the bottom of said bag, substantially as and for the purpose set forth.

O. W. DONNER.

Witnesses:
FRED. HAYNES,
VERNON H. HARRIS.